US009521274B2

(12) United States Patent
Ando

(10) Patent No.: US 9,521,274 B2
(45) Date of Patent: Dec. 13, 2016

(54) DEVICE SHARING PROCESSING OF INPUT DATA WITH AN EXTERNAL INFORMATION PROCESSING APPARATUS

(71) Applicant: Mitsuo Ando, Fukuoka (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/842,304

(22) Filed: Sep. 1, 2015

(65) Prior Publication Data
US 2016/0080587 A1  Mar. 17, 2016

(30) Foreign Application Priority Data

Sep. 11, 2014  (JP) ................. 2014-185145

(51) Int. Cl.
H04N 1/00  (2006.01)
H04N 1/32  (2006.01)

(52) U.S. Cl.
CPC ...... *H04N 1/00244* (2013.01); *H04N 1/00954* (2013.01); *H04N 1/32502* (2013.01); *H04N 1/32587* (2013.01); *H04N 2201/007* (2013.01); *H04N 2201/0094* (2013.01)

(58) Field of Classification Search
None
See application file for complete search history.

(56) References Cited

U.S. PATENT DOCUMENTS

| 8,988,693 | B2 | 3/2015 | Ando | |
| 2006/0290999 | A1* | 12/2006 | Ebitani | G09B 7/02 358/426.06 |
| 2009/0046322 | A1* | 2/2009 | Takahashi | G06F 3/122 358/1.16 |
| 2011/0252265 | A1* | 10/2011 | Iwami | H04N 19/645 713/401 |
| 2013/0073719 | A1 | 3/2013 | Ando | |
| 2014/0016165 | A1 | 1/2014 | Ando | |
| 2014/0146363 | A1 | 5/2014 | Hirokawa et al. | |
| 2015/0163118 | A1 | 6/2015 | Ando | |

FOREIGN PATENT DOCUMENTS

JP    2014-032659    2/2014

* cited by examiner

*Primary Examiner* — Andrew H Lam
(74) *Attorney, Agent, or Firm* — Oblon, McClelland, Maier & Neustadt, L.L.P.

(57) ABSTRACT

A device includes an input unit configured to input first data; a reduction unit configured to perform a part of a first process for the first data inputted by the input unit to generate second data, a data amount of the second data being less than a data amount of the first data, and the first process being requested to be performed by an information processing apparatus connected via a network; a transmission unit configured to transmit the second data generated by the reduction unit to the information processing apparatus; and a reception unit configured to receive third data via the network, the information processing apparatus performing the first process for the second data to generate the third data.

17 Claims, 20 Drawing Sheets

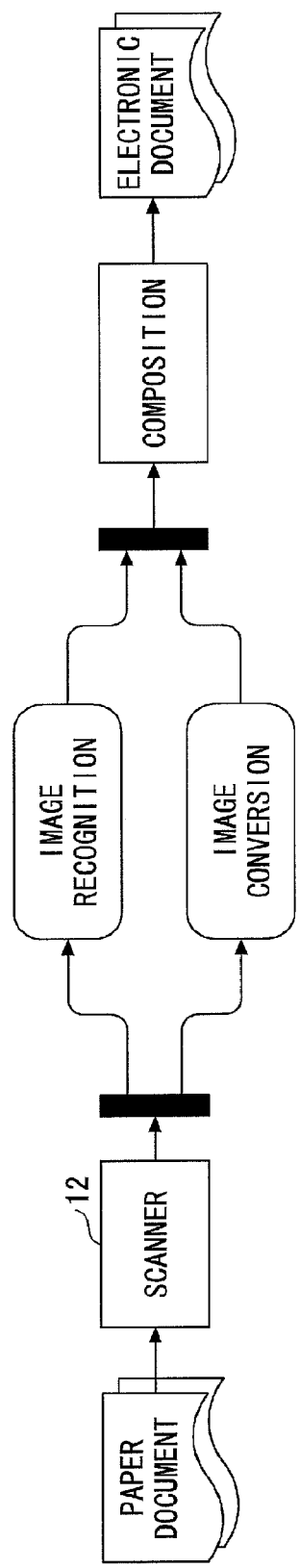

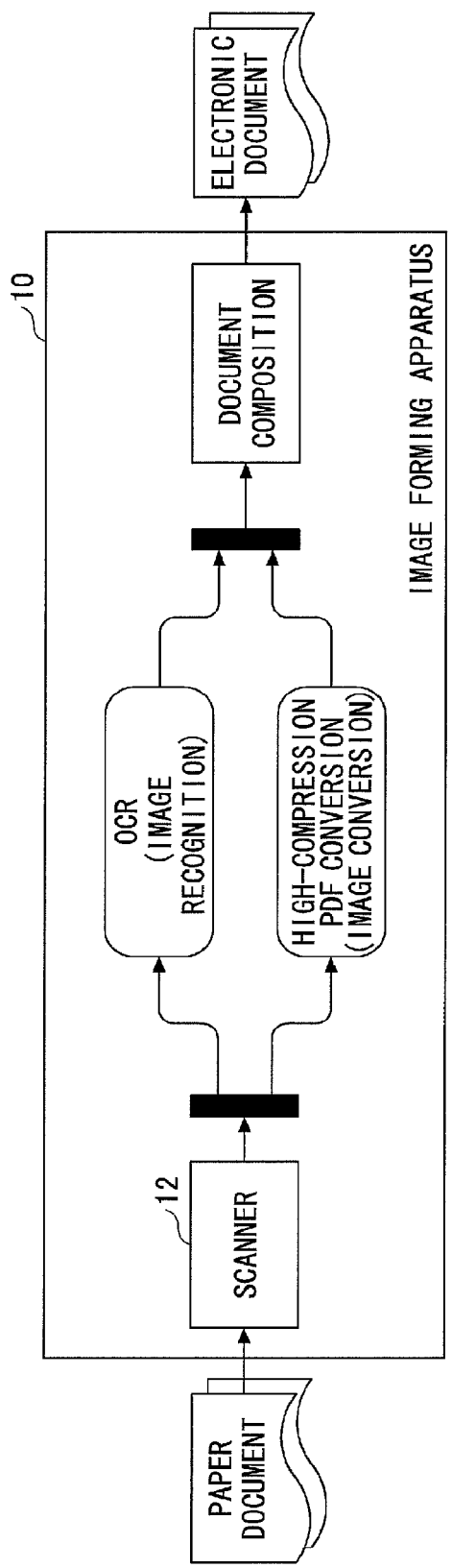

| COMMUNICATION RATE (Kbps) | PROCESSING TIME (SECONDS) |
|---|---|
| 50 | 21.7 |
| 100 | 11.3 |
| 114 | 10 |
| 200 | 6.7 |
| 300 | 4.4 |

| COMMUNICATION RATE (Kbps) | PROCESSING TIME (SECONDS) |
|---|---|
| 5 | 24 |
| 10 | 13 |
| 13.8 | 10 |
| 114 | 3.1 |
| 200 | 2.6 |

```
Title: [CLOUD OCR UTILIZATION] ~ f1
dpiX= 302  dpiY= 302 ~ f2
W= 2480  H= 3507 ~ f3
RotAngle= 0 ~ f4

(190,622)-(243,675) [C]
(258,623)-(313,673) [L]
(323,621)-(377,671) [O]
(391,624)-(418,674) [U]
(436,629)-(484,669) [D]
(496,623)-(524,673) [ ]
(539,623)-(592,670) [O]
       :
```

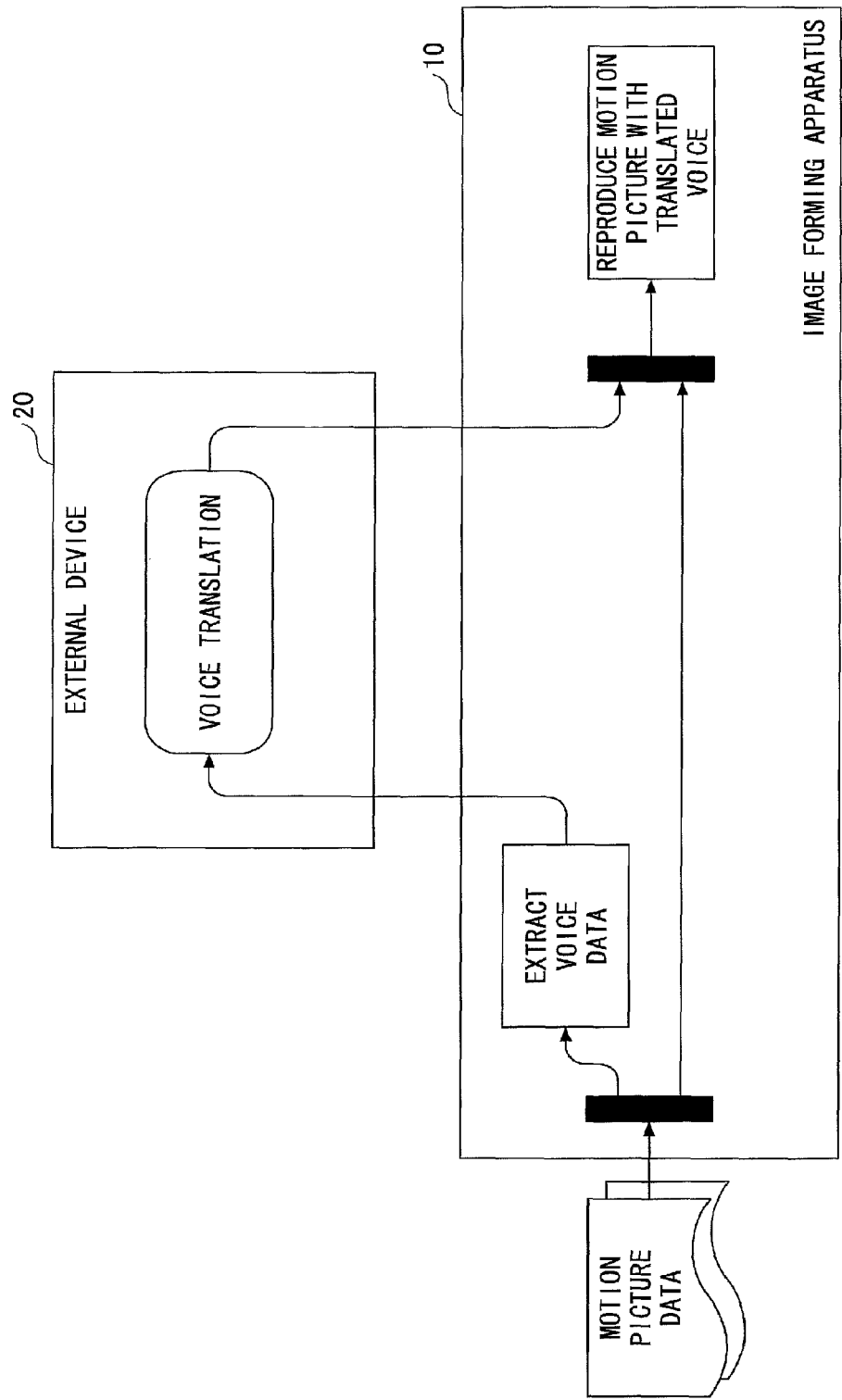

U.S. 9,521,274 B2

DEVICE SHARING PROCESSING OF INPUT DATA WITH AN EXTERNAL INFORMATION PROCESSING APPARATUS

BACKGROUND OF THE INVENTION

1. Field of the Invention

The disclosures herein generally relate to a device, a data processing method and a computer program product.

2. Description of the Related Art

Among image forming apparatuses such as multifunction peripherals, there are apparatuses that can implement applied functions of image processing for image data in addition to inherent functions of image forming apparatuses, such as copying, printing, scanning or the like. For example, there are image forming apparatuses that can execute OCR (Optical Character Recognition) processes or the like for image data obtained by scanning paper documents.

However devices such as image forming apparatuses are strictly restricted in hardware resources, and processing speeds for image processing of high load may be less than those of general-purpose computers or the like.

Then, external devices such as computers having relatively high processing performances may be required to perform image processing of high load via a network.

SUMMARY OF THE INVENTION

It is a general object of at least one embodiment of the present invention to provide a device, a data processing method and a computer program product that substantially obviate one or more problems caused by the limitations and disadvantages of the related art.

In one embodiment, a device includes an input unit configured to input first data; a reduction unit configured to perform a part of a first process for the first data inputted by the input unit to generate second data, a data amount of the second data being less than a data amount of the first data, the first process being requested to be performed by an information processing apparatus connected via a network; a transmission unit configured to transmit the second data generated by the reduction unit to the information processing apparatus; and a reception unit configured to receive third data via the network, the information processing apparatus performing the first process for the second data to generate the third data.

In another embodiment, a data processing method for processing data in a device includes inputting first data; performing a part of a first process for the first data to generate second data, a data amount of the second data being less than a data amount of the first data, the first process being requested to be performed by an information processing apparatus connected via a network; transmitting the second data to the information processing apparatus; and receiving third data via the network, the information processing apparatus performing the first process for the second data to generate the third data.

In yet another embodiment, a non-transitory computer program product is executed on a computer to perform a method, which includes inputting first data; performing a part of a first process for the first data to generate second data, a data amount of the second data being less than a data amount of the first data, the first process being requested to be performed by an information processing apparatus connected via a network; transmitting the second data to the information processing apparatus; and receiving third data via the network, the information processing apparatus performing the first process for the second data to generate the third data.

BRIEF DESCRIPTION OF THE DRAWINGS

Other objects and further features of embodiments will become apparent from the following detailed description when read in conjunction with the accompanying drawings, in which:

FIG. 4 is a diagram schematically illustrating an example of image processing according to the first embodiment;

FIG. 5 is a diagram schematically illustrating image processing in which a specific example is applied to an image recognition process and an image conversion process according to the first embodiment;

FIG. 21 is a diagram illustrating a fourth example of another image processing task that can be required to be performed by the external device.

DESCRIPTION OF THE PREFERRED EMBODIMENTS

First Embodiment

Figure 1:
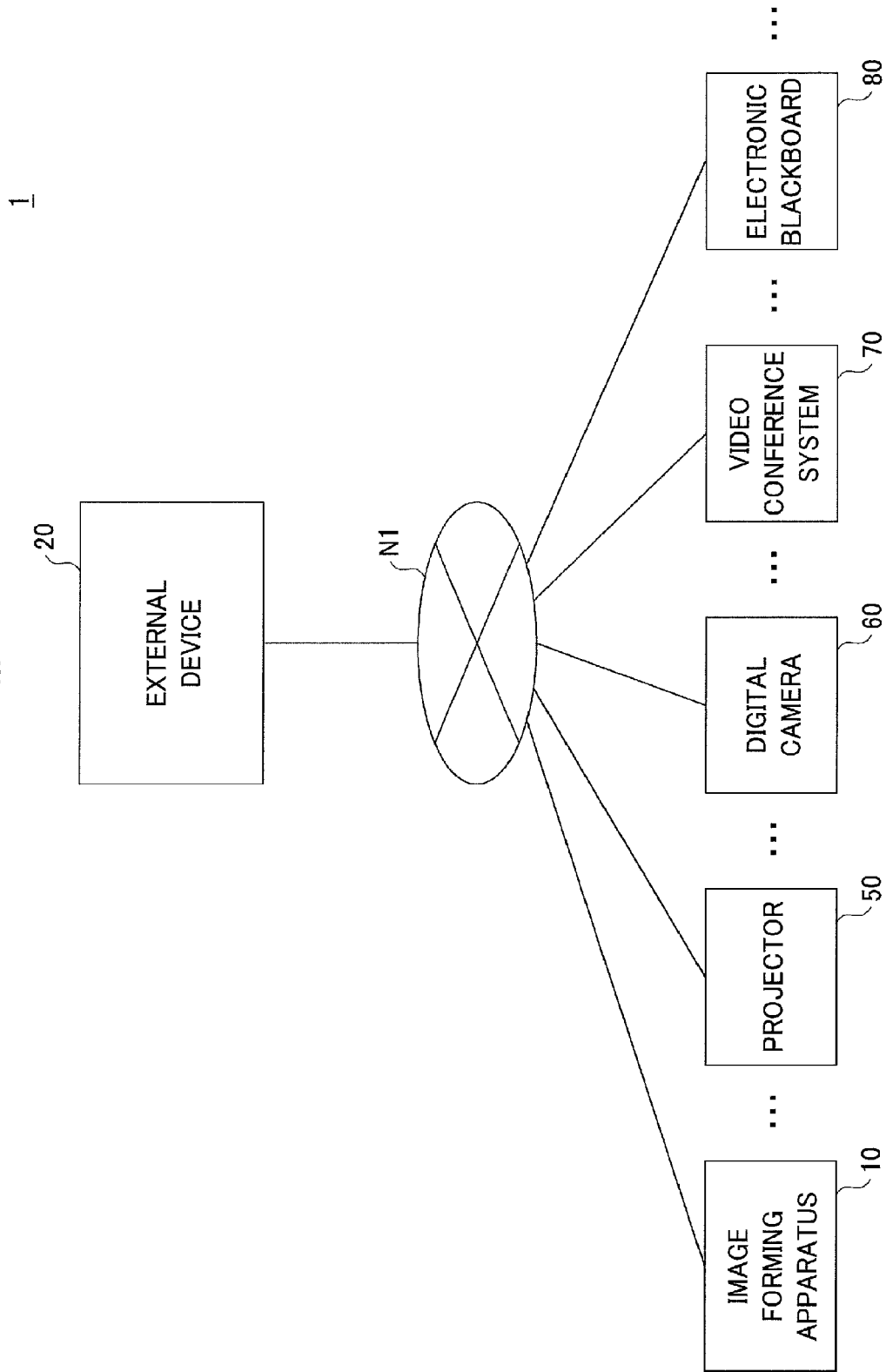
FIG. 1 is a diagram illustrating an example of a configuration of an information processing system according to a first embodiment.

In the following, a first embodiment of the present invention will be described with reference to the accompanying drawings. FIG. 1 is a diagram illustrating an example of a configuration of an information processing system according to the first embodiment. In the information processing system 1 illustrated in FIG. 1, an external device 20 is connected to various devices via a network N1 for a communications connection. The network N1 is, for example, a LAN (Local Area Network), the Internet, a USB (Universal Serial Bus) cable or the like. As examples of the various devices, FIG. 1 shows one or more image forming apparatuses 10, one or more projectors 50, one or more digital cameras 60, one or more video conference systems 70 and one or more electronic blackboards 80.

The image forming apparatus 10 is, for example, a scanner, a printer, a multifunction peripheral or the like. In the present embodiment, the image forming apparatus 10 executes image processing for image data inputted by scanning a paper document. Moreover, the image forming apparatus 10, regarding a part of the image processing, may require it to be transferred to the external device 20. According to the above-described configuration, processing load of the image forming apparatus 10 can be reduced. That is, in the present embodiment, for the image data inputted to the image forming apparatus 10, image processing is performed dispersedly at the image forming apparatus 10 and at the external device 20. Meanwhile, the respective image forming apparatuses 10 may be placed in the same office, the same school or the like, or may be placed in different offices, different schools or the like. Furthermore, devices other than the image forming apparatus 10 may require the external device 20 to perform processing. For example, the projector 50, the digital camera 60, the video conference system 70, the electronic blackboard 80 or other devices (not shown) may require the external device 20 to perform processing.

The external device 20 is a computer or the like that executes a process required to be performed by the image forming apparatus 10. A processing performance of the external device 20 is preferably higher than that of the image forming apparatus 10, which is a request source of the processing. By using, as the external device 20, a computer having a processing performance higher than that of the image forming apparatus 10, compared with a case where the image forming apparatus 10 executes all of the image processing for the image data inputted into the image forming apparatus 10, a processing time is expected to be shortened in the case where at least a part of the image processing is required to be performed by the external device 20. Moreover, the external device 20 may be another image forming apparatus 10, which is different from the image forming apparatus 10 of the request source of the processing. Also in this case, the external device 20 is preferably another image forming apparatus having a higher processing performance than that of the image forming apparatus 10 of the request source of the processing. Meanwhile, the external device 20 may be a computer or a computer system that provides a service as a form of cloud service, a web service, an application provider or the like. The external device 20 may be a computer or a computer system of a PC (Personal Computer) or the like which is placed in the same organization as the organization or the like in which the image forming apparatus 10 is placed.

Figure 2:
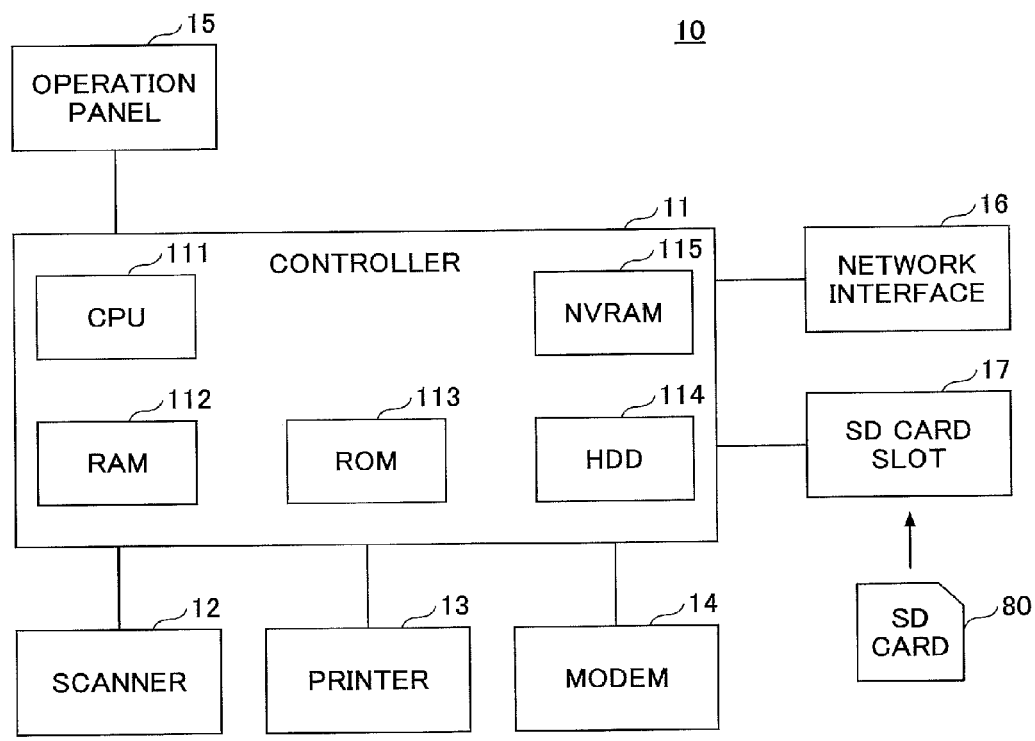
FIG. 2 is a diagram illustrating an example of a hardware configuration of an image forming apparatus according to the first embodiment.

FIG. 2 is a diagram illustrating an example of a hardware configuration of the image forming apparatus according to the first embodiment. In FIG. 2, the image forming apparatus 10 includes a controller 11, a scanner 12, a printer 13, a modem 14, an operation panel 15, a network interface 16, an SD (secure digital) card slot 17 and the like.

The controller 11 includes a CPU (Central processing unit) 111, a RAM (random access memory) 112, a ROM (read-only memory) 113, an HDD (Hard disk drive) 114, an NVRAM (Non-volatile random access memory) 115 and the like. The ROM 113 stores various programs, data used by the programs or the like. The RAM 112 is used as a memory area in which a program is loaded, a work area for the loaded program or the like. The CPU 111 processes a program loaded on the RAM 112, and thereby realizes various functions. The HDD 114 stores a program, various data used by the program or the like. The NVRAM 115 stores variety of configuration information or the like.

The scanner 12 is hardware (image readout means) for reading out image data from a paper document. The printer 13 is hardware (printing means) for printing print data on a print paper. The modem 14 is hardware for connecting to a phone line, and used for executing transmission/reception of image data by facsimile communication. The operation panel 15 is hardware provided with inputting means such as buttons or the like for receiving inputs by a user and displaying means or the like such as a liquid crystal panel or the like. The liquid crystal panel may have a touch panel function. In this case, the liquid crystal panel also has a function of the inputting means. The network interface 16 is hardware for connecting to a network (irrespective of wired/wireless) such as a LAN. The SD card slot 17 is used for reading out a program stored in an SD card 80. That is, in the image forming apparatus 10, not only a program stored in the ROM 113, but also a program stored in the SD card 80 can be loaded in the RAM 112 and executed. Meanwhile, by other recording media (for example, CD-ROM (compact disc read-only memory), USB (Universal Serial Bus) memory or the like), the SD card 80 may be substituted for. That is, a kind of a recording medium corresponding to the positioning of the SD card 80 is not limited to a predetermined kind. In this case, the SD card slot 17 only has to be replaced by hardware in accordance with the kind of the recording medium.

Figure 3:
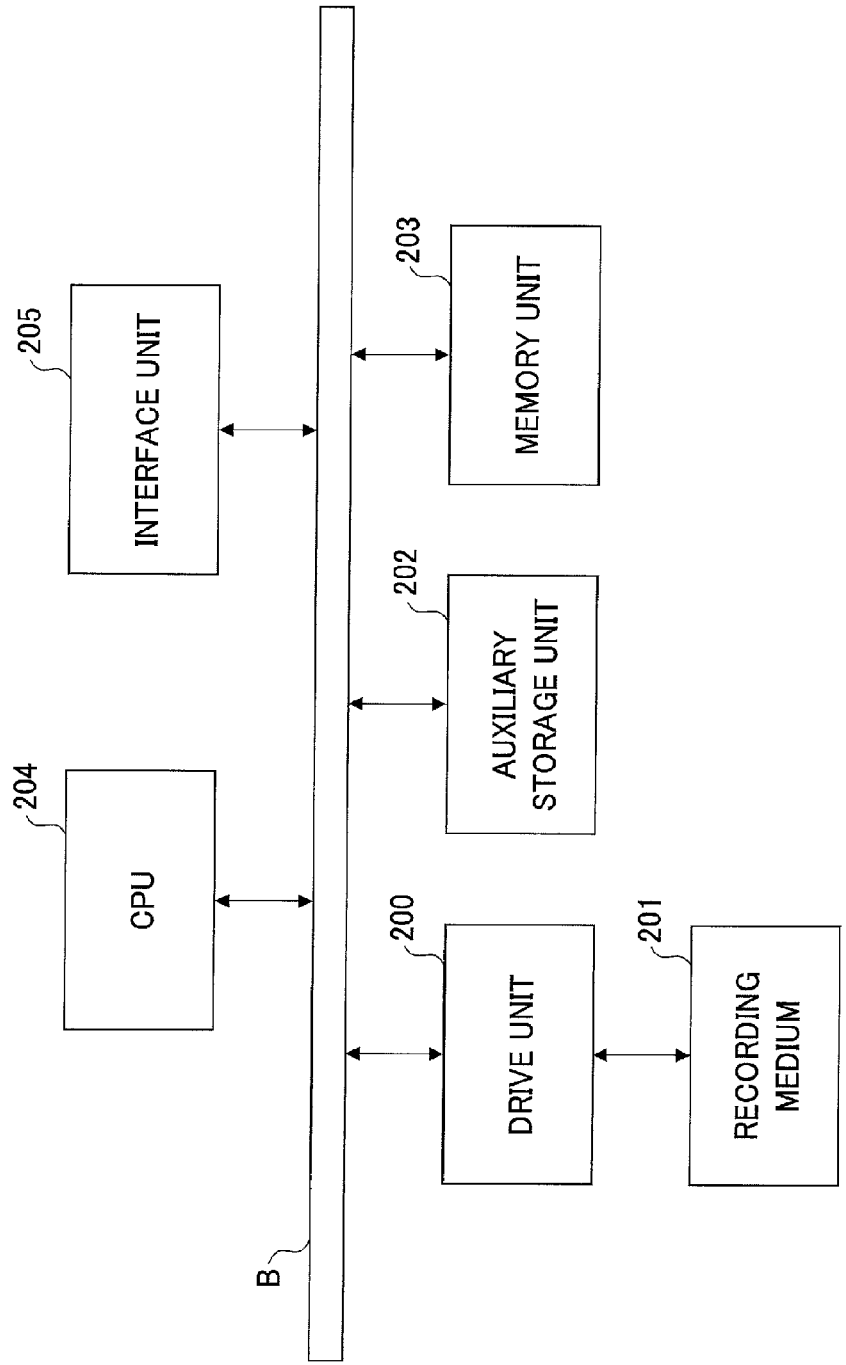
FIG. 3 is a diagram illustrating an example of a hardware configuration of an external device according to the first embodiment.

FIG. 3 is a diagram illustrating an example of a hardware configuration of the external device 20 according to the first embodiment. The external device 20 in FIG. 3 includes a drive device 200, an auxiliary storage device 202, a memory device 203, a CPU 204 and an interface device 205, which are connected with each other via a bus B.

A program that realizes processing in the external device 20 is provided by a recording medium 201, such as CD-ROM. In a case where the recording medium storing the program is set in the drive device 200, the program is installed from the recording medium 201 to the auxiliary storage device 202 via the drive device 200. However, the program does not always have to be installed by a recording medium, but may be downloaded from other computer via a network. The auxiliary storage device 202 stores the program and necessary files, data or the like.

The memory device 203, upon receiving an activation instruction for a program, reads out the program from the auxiliary storage device 202. The CPU 204 executes a function concerning the external device 20 according to the program which is stored in the memory device 203. The interface device 205 is used as an interface for connecting to a network.

Meanwhile, the external device 20 may be configured with plural computers having the hardware as shown in FIG. 3. That is, the processing executed by the external device 20, which will be described later, may be executed dispersedly by the plural computers.

In the present embodiment, an example, in which a part of the image processing executed by the procedure shown in FIG. 4 is required to be performed by the external device 20, will be explained.

FIG. 4 is a diagram schematically illustrating the image processing according to the first embodiment. In the image processing shown in FIG. 4, at first, an image on a paper document is scanned (read out) by the scanner 12 of the image forming apparatus 10, and image data indicating the image (in the following, referred to as "scan image") are generated. The scan image is, for example, color data in JPEG (Joint Photographic Experts Group) format. However, the format of the scan image after scanning is not limited to a predetermined format.

Subsequently, an image recognition process is executed for the scan image. Moreover, an image conversion process is executed for the scan image. The image recognition process is, for example, a process of analyzing contents of the image indicated by the scan image and recognizing a form of the image. The image conversion process is, for example, a process of converting a size or a capacity of the image data, a process of converting a data format of the image data or the like. Meanwhile, the image recognition process and the image conversion process shown in FIG. 4 do not have interdependence. Therefore, the image recognition process and the image conversion process can be executed in parallel. However, either one of the image recognition process and the image conversion process may depend on the other.

Subsequently, a composition process is executed for data obtained by the image recognition process and data obtained by the image conversion process. As a result, one electronic document is generated.

Meanwhile, in the following, an OCR (Optical Character Recognition) process (character recognition process) is an example of the image recognition process, and a high-compression PDF (portable document format) conversion process is an example of the image conversion process. Accordingly, in the present embodiment, image processing, shown in FIG. 5, is executed.

FIG. 5 is a diagram schematically illustrating the image processing in which a specific example is applied to the image recognition process and the image conversion process. The high-compression PDF conversion process is a process of generating high-compression PDF data based on the scan image. The high-compression PDF data are PDF data in which a data amount (data size) is considerably smaller than that of conventional PDF data while maintaining appearance by processing separately a color character region, a black character region, a picture region and the like of a color image.

In the composition process, for high-compression PDF data, by using a multi-layer structure of PDF data, text data obtained as a result of the OCR process are inserted into a text layer as transparent text. The text data represent character strings. As a result, an electronic document (high-compression PDF with transparent text), in which retrieval of a character in the image, a highlight displaying or the like are possible, is generated.

Here, by requiring at least one of the OCR process or the high-compression PDF conversion process to be executed by the external device 20, a processing time for an entire processing shown in FIG. 4 is expected to be reduced. In the present embodiment, the OCR process is assumed to be performed by the external device 20. In this case, a scan image is necessarily forwarded to the external device 20, but according to the data amount of the scan image and the communication rate of the network N1, regarding the reduction of the processing time, the desired effect is not necessarily obtained. The processing time is obtained with the following formula 1.

$$\text{Processing time}(T) = \text{OCR process time}(Tp) + \text{Transfer time}(Tt) \quad \text{(formula 1)}$$

$$\text{Transfer time}(Tt) = \text{Upload time}(=\text{Transfer size}/Au) + \text{Download time}(=\text{Transfer size}/Ad)$$

where Au is a communication rate upon uploading and Ad is a communication rate upon downloading.

The transfer size upon uploading from the image forming apparatus 10 to the external device 20 is a data amount of the scan image, and the transfer size upon downloading from the external device 20 to the image forming apparatus 10 is a data amount of data obtained by the OCR process. Meanwhile, the upload time or the download time includes not only the transfer time of the data, but also, for example, a time required until the data transfer starts, such as a handshake time. But, here, for the purpose of explanation, such time is assumed to be negligible.

Here, regarding a processing time of the OCR process per one sheet of a paper document, the processing time by the image forming apparatus 10 is assumed to be 10 seconds and the processing time by the external device 20 is assumed to be 1 second. That is, the external device 20 is assumed to have a processing performance of 10 times that of the image forming apparatus 10 regarding the OCR process. Moreover, the data amount of the scan image is assumed to be 1 M bytes, and a data amount of the text data obtained by the OCR process is assumed to be 10 K bytes. Furthermore, the communication rate Au in the upload direction and the communication rate Ad in the download direction are assumed to be the same. Then, the processing time by the external device 20 is obtained by the following formula 2.

$$\text{Processing time} = 1(\text{second}) + (1(\text{M bytes}) + 10(\text{K bytes}))/\text{Communication rate} \quad \text{(formula 2)}$$

Figures 6A, 6B:
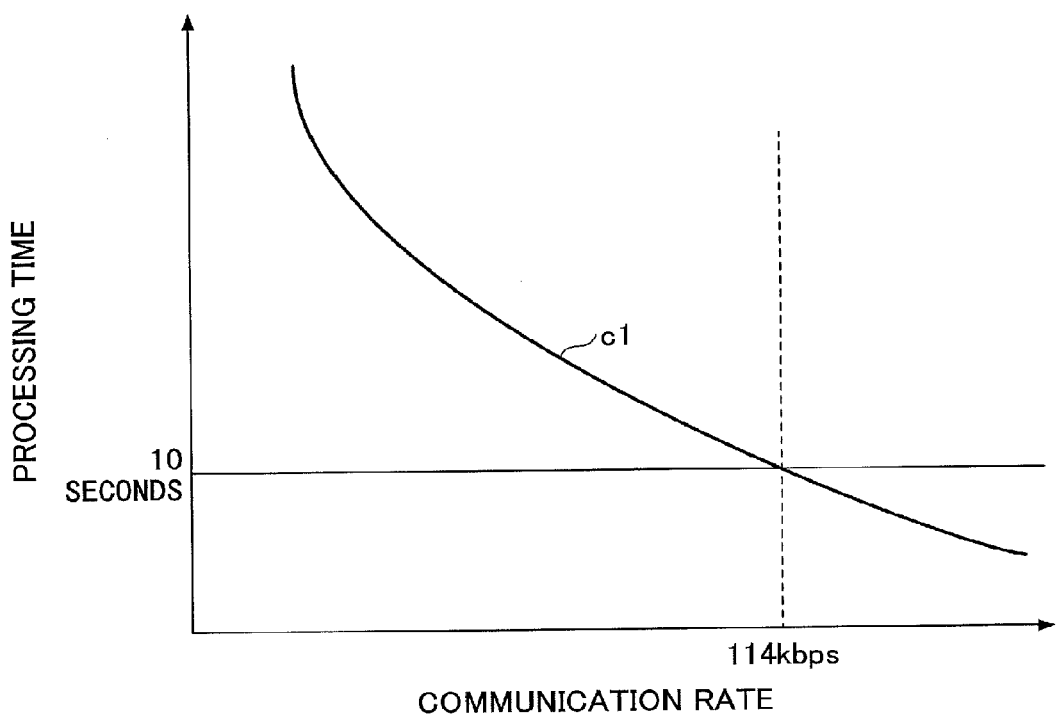
FIGS. 6A and 6B are diagrams illustrating an example of a first relation between a communication rate and a processing time.

In formula 2, a relation between the communication rate and the processing time is as shown in FIGS. 6A and 6B. FIGS. 6A and 6B are diagrams illustrating an example of a first relation between the communication rate and the processing time. In FIGS. 6A and 6B, a relation between the communication rate and the processing time in formula 2 is shown in a table form and in a graph form. Meanwhile, in the graph, a curve c1 indicates the relation between the communication rate and the processing time.

Here, the processing time of the OCR process in the image forming apparatus 10 is 10 seconds. Moreover, for the image forming apparatus 10, the transfer time can be considered to be 0 seconds. Accordingly, the processing time in the image forming apparatus 10 is 10 seconds. Then, in the present example, in a case where the communication rate exceeds 114 K bps, if the OCR process is performed in the external device 20, the entire processing time is found to be shortened.

In the present embodiment, by lowering such threshold regarding the communication rate (114 K bps), likelihood that the time required for the OCR process is shortened if the OCR process is performed in the external device 20 is increased. For example, in a case where the data amount of the transfer data can be supposedly reduced to one tenth, the processing time by the external device 20 is obtained by the following formula 3.

Processing time=1(second)+(100(K bytes)+10(K bytes))/Communication rate (formula 3)

Figures 7A, 7B:
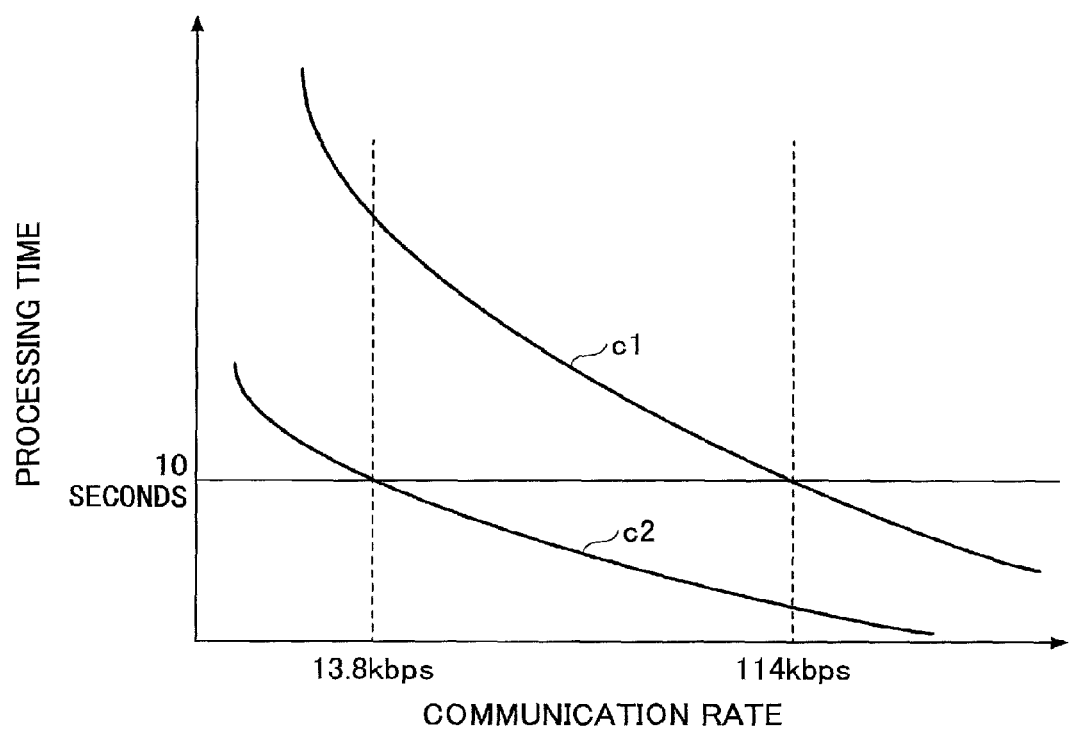
FIGS. 7A and 7B are diagrams illustrating an example of a second relation between the communication rate and the processing time.

In formula 3, a relation between the communication rate and the processing time is as shown in FIGS. 7A and 7B. FIGS. 7A and 7B are diagrams illustrating an example of a second relation between the communication rate and the processing time. In FIGS. 7A and 7B, a relation between the communication rate and the processing time in formula 3 is shown in a table form and in a graph form. Meanwhile, in the graph, a curve c2 corresponds to formula 3, and a curve c1 corresponds to formula 2. According to the curve c2, in a case where the communication rate exceeds 13.8 K bps, if the OCR process is performed in the external device 20, the time required for the OCR process is found to be shortened. That is, if the data amount of the transfer data can be made smaller, likelihood that the time required for the OCR process in the case where the OCR process is performed by the external device 20 is shortened can be increased. Therefore, in the present embodiment, the OCR process shown in FIG. 4 is required to be performed by the external device 20, as shown in FIG. 8.

Figure 8:
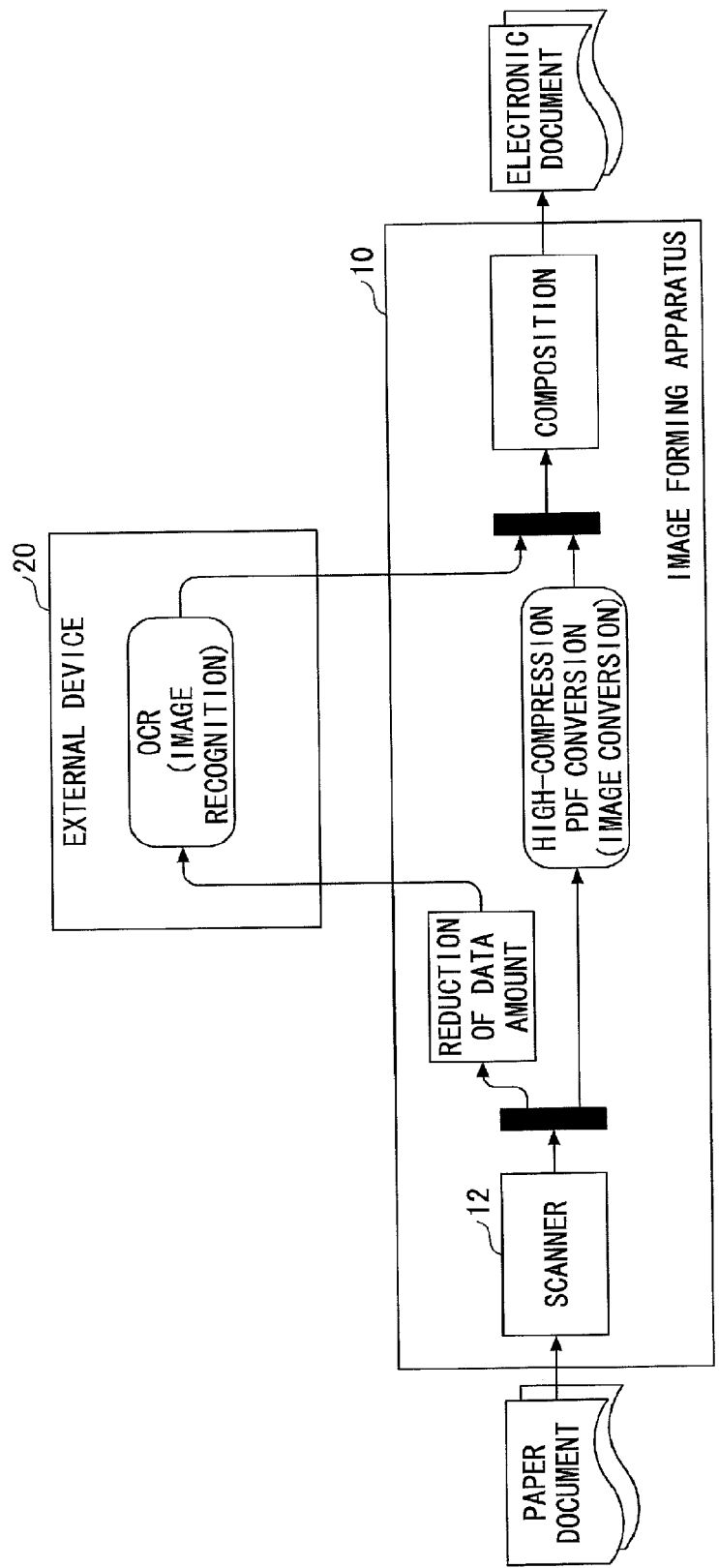
FIG. 8 is a diagram for schematically explaining a request for an OCR process to the external device according to the first embodiment.

FIG. 8 is a diagram for schematically explaining the request for the OCR process to be performed by the external device 20 according to the first embodiment. FIG. 8 shows that the OCR process is executed by the external device 20. Moreover, in the image forming apparatus 10, as a process of a stage prior to the OCR process, a data amount reduction process is executed. The data amount reduction process is a process of generating image data (hereinafter, referred to as "reduced data") in which a part of or all of information unnecessary for a process (here, the OCR process) to be performed by the external device 20 is removed from information included in the scan image. Since the reduced data are obtained by removing a part of the information included in the scan image, a data amount is less than that of the scan image. Therefore, by assigning data generated by the data amount reduction process to the transfer data, likelihood that the time required for the OCR process is shortened in the case where the OCR process is performed by the external device 20 can be increased.

Figure 9:
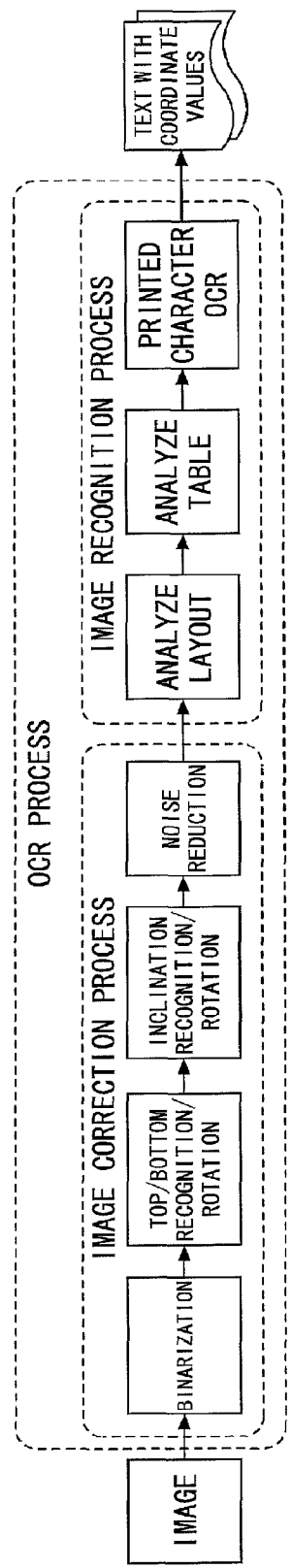
FIG. 9 is a diagram for explaining an example of a procedure of an OCR process according to the first embodiment.

In order to explain the data amount reduction process, details of the OCR process will be explained. FIG. 9 is a diagram for explaining an example of a procedure of the OCR process. The OCR process is a process in which image data are input data and text data with coordinate values are output data. As shown in FIG. 9, the OCR process includes an image correction process and an image recognition process.

The image correction process is, for example, a process of correcting inputted image data into a state suitable for OCR. In the image correction process, for example, a binarization process, a top/bottom recognition/rotation process, an inclination recognition/rotation process, and a noise reduction process are executed in this order.

The binarization process is a process of generating a monochrome image suitable for OCR. The top/bottom recognition/rotation process is a process of determining a top/bottom direction of the monochrome image and modifying it in a right direction. The inclination recognition/rotation process is a process of analyzing inclinations of characters, ruled lines or the like, and modifying so that the characters, the ruled lines or the like are in a horizontal direction. The noise reduction process is a process of removing a smear adhered on a paper document to be scanned (noise), contamination incorporated upon scanning the paper document, a screen pattern drawn under characters, or the like.

The image recognition process is a process of dividing elements in an image (the image generated by the image correction process) into characters, diagrams, pictures, tables and the like, and performing printed character OCR (printed character recognition) for the characters. In the image recognition process, for example, a layout analysis process, a table analysis process and a printed character OCR process are executed in this order.

The layout analysis process is a process of extracting a character region, a table region, a rule line region, a diagram region and the like in the image. The table analysis process is a process of extracting a character region and a ruled line in the table region. The printed character OCR process is a process of clipping characters in the character region one by one, and recognizing the characters.

As is clear from the above description, in the processes after the binarization process, a monochrome image is to be processed. In other words, in the processes after the binarization process, a color image is not indispensable. Gradation numbers of a color image and of a monochrome image are different from each other, and for the same image content, a data amount of the monochrome image is less than that of the color image. Then, in the case of assigning data of the monochrome image generated by the binarization process to the transfer data, the transfer time can be shortened compared with the case of transferring the scan image.

Figure 10:
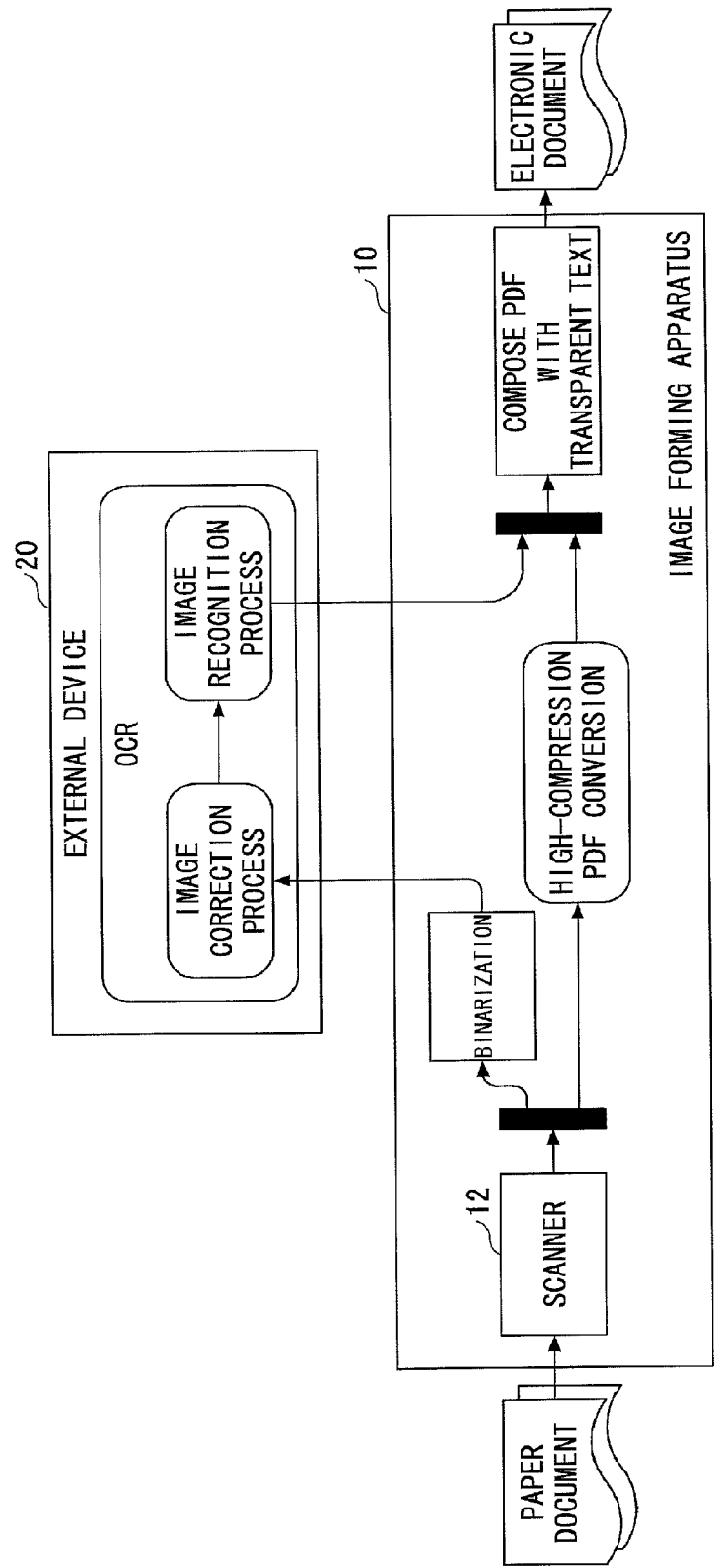
FIG. 10 is a diagram for schematically explaining a request for an OCR process to the external device according to the first embodiment.

Then, in the present embodiment, as shown in FIG. 10, the image processing is required to be performed by the external device 20. FIG. 10 is a diagram for schematically explaining details of the request for the OCR process of the external device 20 according to the first embodiment. FIG. 10 shows specifically the contents of FIG. 8 in detail.

In FIG. 10, the image forming apparatus 10 executes the binarization process for the scan image. Monochrome image data generated according to the binarization process are transferred to the external device 20. That is, in the present embodiment, the binarization process is an example of the data amount reduction process. Moreover, the monochrome image data generated according to the binarization process are an example of the reduced data.

The external device 20 executes for the reduced data the image correction process and the image recognition process which are included in the OCR process. However, for the image correction process, the binarization process does not have to be executed. This is because the binarization process has already been executed by the image forming apparatus 10. The external device 20 returns text data with coordinate values generated by the OCR process to the image forming apparatus 10.

The image forming apparatus 10 combines the high-compression PDF data generated by the high-compression PDF conversion process with the text data with coordinate values, and generates high-compression PDF data with transparent texts.

Figures 11, 12:
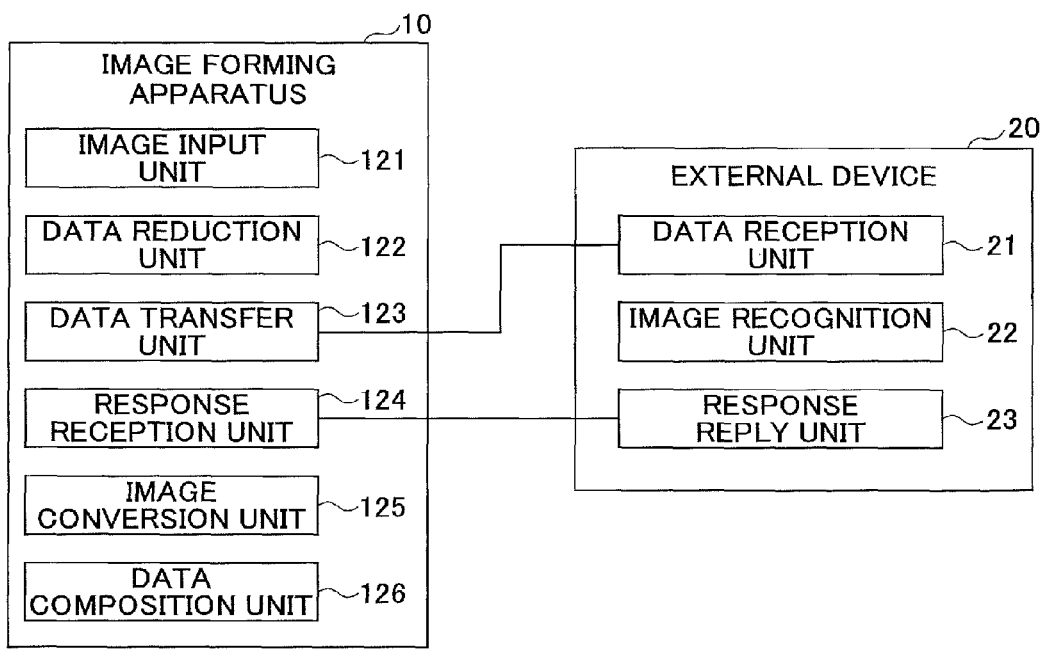
FIG. 11 is a diagram illustrating an example of text data with coordinate values.
FIG. 12 is a diagram illustrating an example of a functional configuration of the image forming apparatus and the external device according to the first embodiment.

Meanwhile, the text data with coordinate values generated by the OCR process has a configuration as shown in FIG. 11, for example. FIG. 11 is a diagram illustrating an example of the text data with coordinate values.

In FIG. 11, text data with coordinate values include, for example, a title field f1, a resolution field f2, a size field f3, a rotation angle field f4 and the like.

The title field f1 includes a character string of a title part of an image, which is an extraction source. The title part in the image is, for example, specified based on a size relation of characters or the like. The resolution field f2 includes a resolution of an image, which is an extraction source of the text. The size field f3 includes pixel numbers in the width direction and pixel numbers in the height direction of the image, which is the extraction source of the text. The rotation angle field f4 includes an inclination of an image which is an extraction source.

In the text data with coordinate values, the above-described field group is followed by, for each recognized character, coordinate values of a rectangle surrounding the character and the characters associated with each other.

Meanwhile, in the present embodiment, the text data with coordinate values are not limited to a predetermined format, as long as information, which is necessary for embedding the text data into a text layer of high-compression PDF data, is included. For example, the coordinate values of the respective characters are used for specifying positions of the respective characters in the text layer of the high-compression PDF.

For the OCR process, in order to make it possible to be performed by the external device 20, as shown in FIG. 10, the image forming apparatus 10 and the external device 20 have a functional configuration as shown in FIG. 12.

FIG. 12 is a diagram illustrating an example of the functional configuration of the image forming apparatus and the external device according to the first embodiment. In FIG. 12, the image forming apparatus 10 includes an image input unit 121, a data reduction unit 122, a data transfer unit 123, a response reception unit 124, an image conversion unit 125, a data composition unit 126 and the like. The respective above-described units are realized by processes which one or more programs installed in the image forming apparatus 10 cause the CPU 111 to execute.

The image input unit 121 causes the scanner 12 to read out an image of a paper document, and generates image data (scan image) indicating the image. That is, by the image input unit 121, the scan image is inputted into the image forming apparatus 10. The scan image may be a color image. The data reduction unit 122 executes the binarization process for the scan image, and generates image data (reduced data) of a monochrome image. The data transfer unit 123 transfers (transmits) the reduced data to the external device 20. The response reception unit 124 receives results of an OCR process regarding the reduced data (i.e. text data with coordinate values) from the external device 20. The image conversion unit 125 executes a high-compression PDF conversion process for the scan image, and generates high-compression PDF data. The data composition unit 126 combines the high-compression PDF data with the text data with coordinate values.

The external device 20 includes a data reception unit 21, an image recognition unit 22, a response reply unit 23 and the like. The respective above-described units are realized by processes which one or more programs installed in the external device 20 cause the CPU 204 to execute.

The data reception unit 21 receives the reduced data transmitted from the image forming apparatus 10. The image recognition unit 22 executes the OCR process for the reduced data, and generates unit 23 returns the text data with coordinate values to the image forming apparatus 10.

Figure 13:
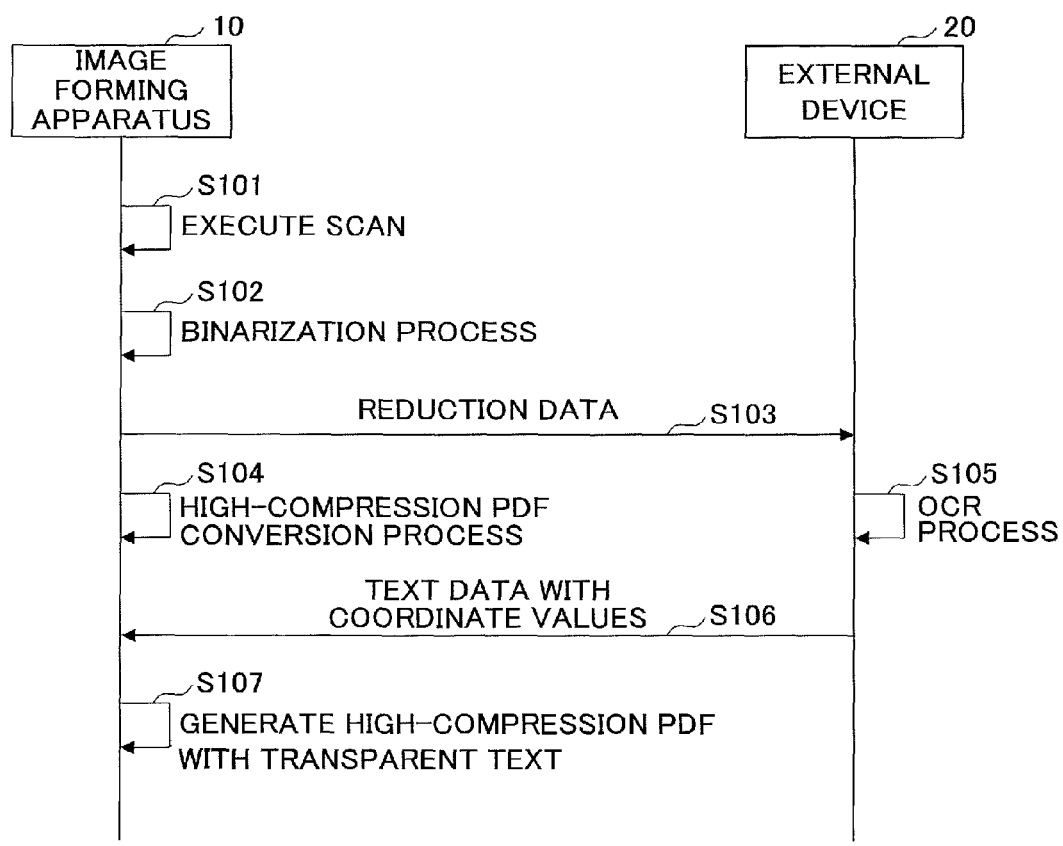
FIG. 13 is a sequence diagram for explaining an example of a processing procedure executed by the information processing system according to the first embodiment.

In the following, a processing procedure executed in the image processing system 1 will be explained. FIG. 13 is a sequence diagram for explaining an example of the processing procedure executed by the information processing system 1.

In a case where a paper document is put in the image forming apparatus 10 and a predetermined operation is performed by a user, the image input unit 121 controls the scanner 12 to read out an image of the paper document (step S101). The image input unit 121 generates a scan image indicating the read out image.

Subsequently, the data reduction unit 122 executes the binarization process for the scan image, and generates reduced data of a monochrome image (step S102). Then, the data transfer unit 123 transfers the reduced data to the external device 20 (step S103).

Subsequently, the image conversion unit 125 executes the high-compression PDF conversion process for the reduced data, and generates high-compression PDF data (step S104). Then, the data composition unit 126 waits for a response from the external device 20.

On the other hand, in a case where in the external device 20 the reduced data are received by the data reception unit 21, the image recognition unit 22 executes the OCR process for the reduced data (step S105). On this occasion, the binarization process may be omitted. As a result of the OCR process, text data with coordinate values are generated. In the text data with coordinate values, a character group extracted from a character region in an image which the reduced data indicate is included. Moreover, coordinate values regarding the respective characters are also included. Then, the response reply unit 23 replies by sending the text data with coordinate values to the image forming apparatus 10 (step S106).

The data composition unit 126, upon receiving text data with coordinate values from the external device 20, combines the text data with coordinate values with the high-compression PDF data generated at step S104 (step S107). That is, characters included in the text data with coordinate values are inserted into a text layer of the high-compression PDF data. Insertion positions for the respective characters are specified based on the coordinate values included in the text data with coordinate values.

Meanwhile, an execution order relation for steps S102 to S106 is not limited to a specific one. For example, step S106 may be executed while executing step S104. In this case, the data composition unit 126 may wait for completion of step S104 and execute step S107. Moreover, step S104 may be executed before step S103. In this case, step S104 may be executed in parallel with step S102.

For example, Japanese Published Patent Application No. 2014-32659 discloses a system including plural devices and an apparatus being connected to the devices via a network and including a unit storing plural screen data in association with identification data of the plural devices. Each of the plural screen data includes components associated with a process condition and destination data. A device included in the plural devices includes a unit obtaining screen data corresponding to an identification data of the device from the plural screen data, a unit displaying a screen based on the screen data, a unit inputting image data according to the process condition associated with the components selected by way of the screen, and a unit transmitting the image data and the identification data of the device to the apparatus. The apparatus further includes a unit transferring the transmitted image data to a destination indicated in the destination data corresponding to the transmitted identification data. According to the system disclosed in Japanese Patent Application No. 2014-32659, a device and a service provided via a network can be cooperated.

As described above, according to the first embodiment, the reduced data, from which information unnecessary for the OCR process required to be performed by the external device 20 is removed, are transferred to the external device 20. As a result, an influence of a communication rate of the network N1 regarding a request for processing by the external device 20 can be reduced. Accordingly, in the case of executing the OCR process by the external device 20, rather than executing the OCR process in the image forming apparatus 10, likelihood that time required for the OCR process is shortened can be increased.

Moreover, the data amount reduction process for generating the reduced data is a process forming a part of the OCR process required to be executed by the external device 20, such as the binarization process, for example. That is, the binarization process is a process executed regardless of whether the OCR process is required to be executed by the external device 20. Therefore, an increase of an amount of calculation in the whole information processing system 1 by executing the data amount reduction process can be suppressed. As a result, likelihood that the effect by shortening a transfer time of reduced data is reduced by the data amount reduction process can be lowered.

Meanwhile, the image conversion process performed by the image forming apparatus 10 may not be the high-compression PDF conversion process. For example, it may be a process of converting into PDF data.

Figure 14:
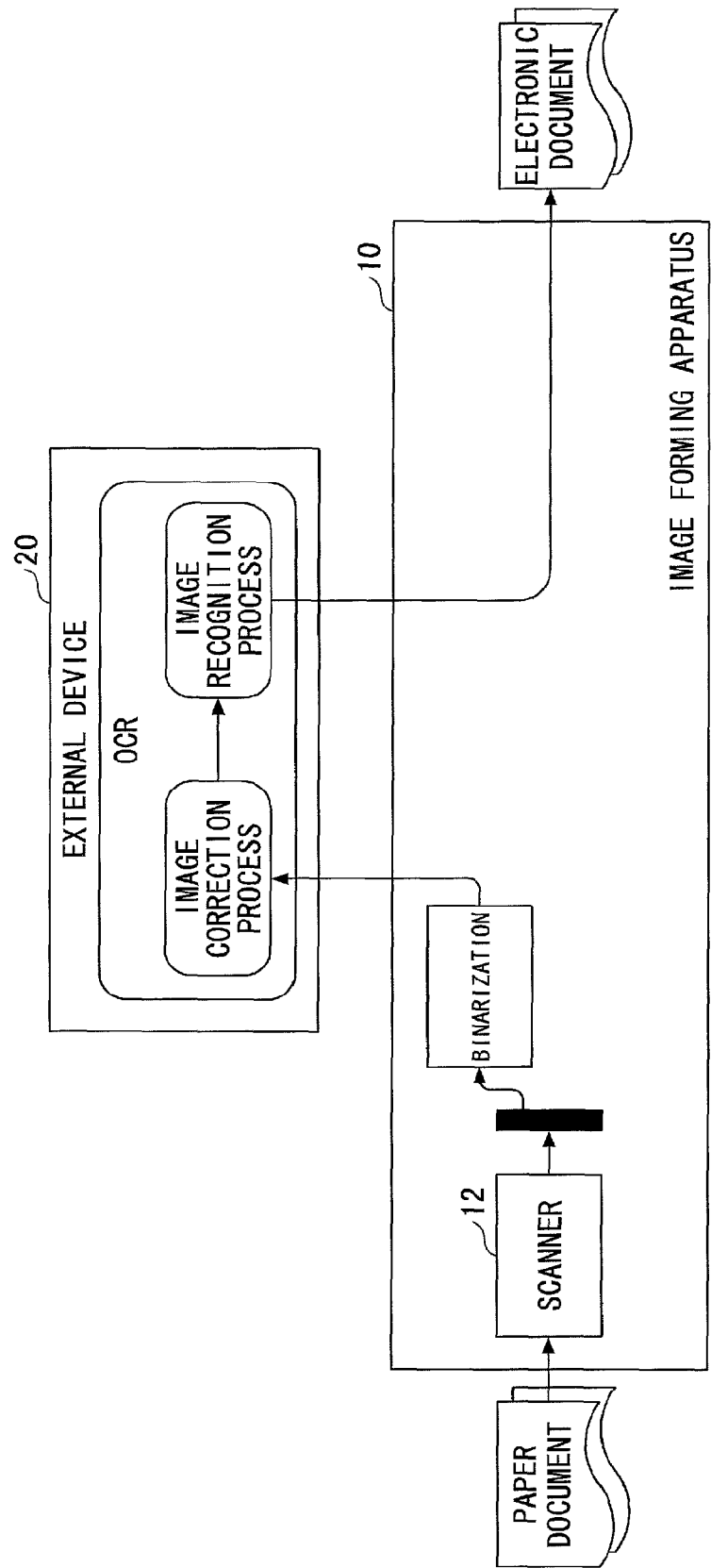
FIG. 14 is a diagram for explaining an example of a form in which an image conversion process and a composition process by the image forming apparatus according to the first embodiment are not executed.

Moreover, the image conversion process and the composition process may not be executed by the image forming apparatus. FIG. 14 is a diagram for explaining a form in which the image conversion process and the composition process are not executed by the image forming apparatus 10. In FIG. 14, the image forming apparatus 10 does not execute the high-compression PDF conversion process and the composition process. The image forming apparatus 10 outputs text data with coordinate values received from the external device 20 or character string data included in the text data with coordinate values as deliverables (an electronic document shown in FIG. 14). In the form shown in FIG. 14, the user can promptly obtain a result of the OCR process for the paper document.

Moreover, in the case where distribution or the like of deliverables is performed by the external device 20, the composition process may be executed by the external device 20.

Figure 15:
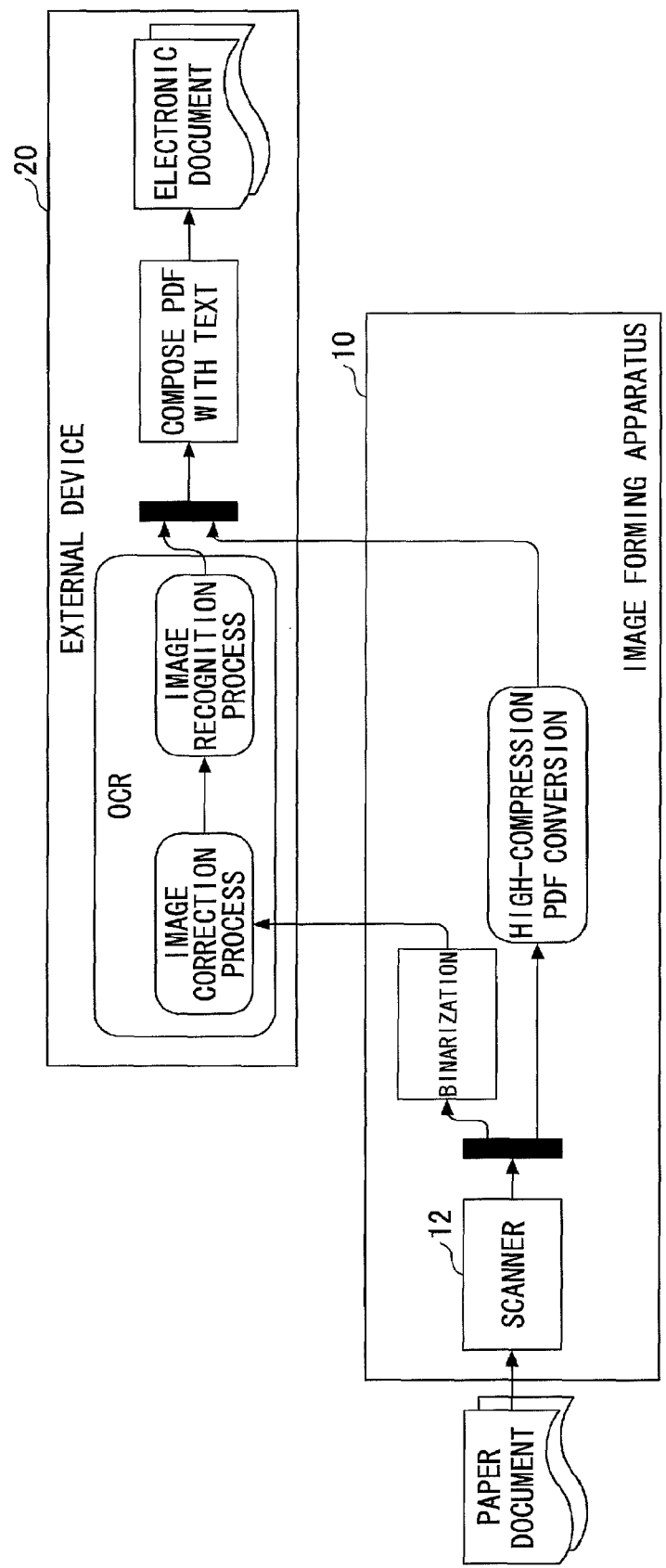
FIG. 15 is a diagram for explaining an example of a form in which the composition process by the external device according to the first embodiment is executed.

FIG. 15 is a diagram for explaining a form in which the composition process by the external device 20 is executed. In FIG. 15, the data transfer unit 123 of the image forming apparatus 10 transfers high-compression PDF data generated by the image conversion unit 125 to the external device 20. Meanwhile, the high-compression PDF data may be transferred along with reduced data generated by the data reduction unit 122, or may be separately transferred (for example, at timings where they are generated, respectively).

The external device 20 generates high-compression PDF data with transparent texts by combining text data with coordinate values generated by the OCR process with the high-compression PDF data transferred from the image forming apparatus 10. Meanwhile, in the form of FIG. 15, the image forming apparatus 10 may not include the data composition unit 126. On the other hand, the external device 20 includes the data composition unit 126. The external device 20 distributes the generated high-compression PDF data with transparent texts to, for example, a predetermined destination. The predetermined destination may be specified by the user based on information inputted to the image forming apparatus 10 upon scanning the paper document in the image forming apparatus 10, for example.

Meanwhile, also in the form of FIG. 15, data generated by the image conversion unit 125 may be PDF data, not high-compression PDF data.

Second Embodiment

Next, a second embodiment of the present invention will be explained. In the second embodiment, a difference from the first embodiment will be explained. Therefore, a point which is not specifically mentioned may be the same as that in the first embodiment.

Figure 16:
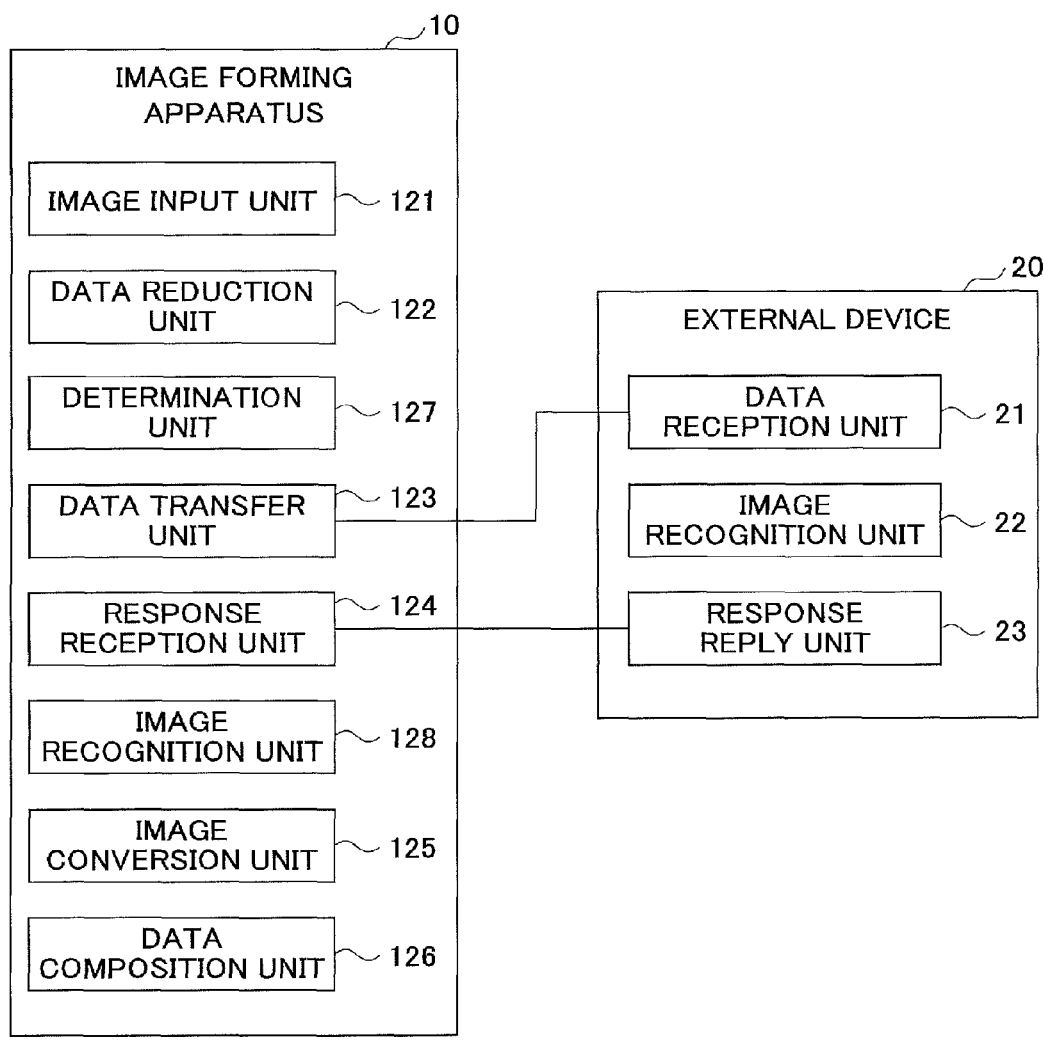
FIG. 16 is a diagram illustrating an example of a functional configuration of the image forming apparatus and the external device according to a second embodiment.

FIG. 16 is a diagram illustrating an example of a functional configuration of the image forming apparatus and the external device according to the second embodiment. In FIG. 16, the same reference numeral is assigned to the same component as that in FIG. 12, and explanation thereof will be omitted.

In FIG. 16, the image forming apparatus 10 further includes a request determination unit 127 and an image recognition unit 128. The respective above-described units are realized by processes which one or more programs installed in the image forming apparatus 10 cause the CPU 111 to execute.

The request determination unit 127 determines whether the OCR process is requested to be performed by the external device 20. For example, the determination unit 127 determines whether the OCR process is requested to be performed by the external device 20, based on a communication rate of the network N1, data amount the reduced data, an estimated processing time for an OCR process by the image recognition unit 22 and an estimated processing time for an OCR process by the image recognition unit 128.

The image recognition unit 128 executes the OCR process other than a binarization process. The image recognition unit 128 may be realized by the same program as the image recognition unit 22.

Figure 17:
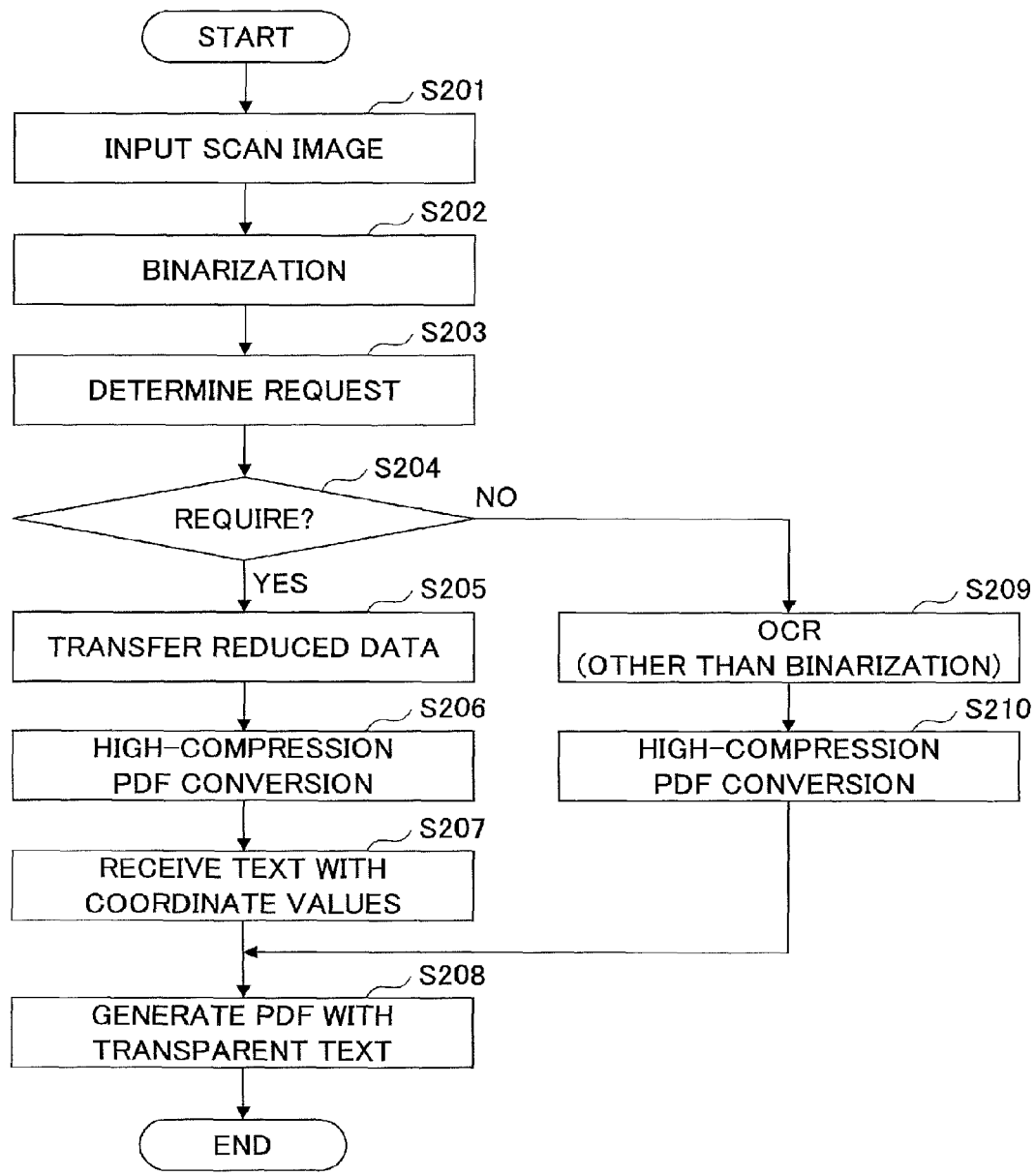
FIG. 17 is a flowchart for explaining an example of a processing procedure executed by the image forming apparatus according to the second embodiment.

FIG. 17 is a flowchart for explaining an example of a processing procedure executed by the image forming apparatus 10 according to the second embodiment.

In FIG. 17, steps S201 and S202 are the same as steps S101 and S102 in FIG. 13, respectively. Following step S202, the determination unit 127 determines whether the OCR process is to be requested to be performed by the external device 20 (step S203). For example, the determination unit 127 determines that the OCR process is to be requested to be performed, in the case where it is determined that the processing time is shorter if the determination unit 127 makes the request to the external device 20 based on the data amount of the reduced data generated at step S202, an estimated data amount of text data with coordinate values generated by the OCR process, a communication rate of the network N1, an estimated processing time for the OCR process by the image recognition unit 22 and an estimated processing time for the OCR process by the image recognition unit 128. Otherwise, the determination unit 128 determines that the OCR process is not to be determination may be performed based on contents explained for the above-described formula 2 or 3 and FIG. 6 or 7.

That is, it may be determined whether the OCR process is to be requested to be performed by comparing a processing time, which is obtained by applying the communication rate of the network N, the data amount of the reduced data, the estimated data amount of the text data with coordinate values generated by the OCR process and the estimated processing time of the OCR process by the image recognition unit 22 to formula 2 or 3, with the estimated processing time of the OCR process by the image recognition unit 128.

Meanwhile, the communication rate of the network N1 may be measured during the scan being executed or the like, or a result which is preliminarily measured may be stored in the HDD 114 or the like. Moreover, the estimated data amount of the text data with coordinate values generated by the OCR process, the estimated processing time of the OCD process by the image recognition unit 22, the estimated processing time of the OCR process by the image recognition unit 128 and the like, fixed values thereof may be stored in the HDD 114 or the like, respectively. Or, for the estimated data amount and the estimated processing time, in the case where a correlation relation with the reduced data can be found experimentally, the estimated data amount and the estimated processing time may be calculated by applying the data amount of the reduced data to a function based on the correlation relation.

In the case where it is determined that a processing time by the external device 30 is not shorter than the estimated processing time of the OCR process by the image recognition unit 128 (step S204: YES), the image recognition unit 128 executes the OCR process for the reduced data, and generates test data with coordinate values (step S209). In the OCR process, the binarization process may be omitted. Then, the image conversion unit 125 executes the high-compression PDF conversion process for the scan image, and generates high-compression PDF data (step S210). Meanwhile, anteroposterior relation for steps S209 and S210 is not limited to a predetermined one. Subsequently, the data composition unit 126 combines the text data with coordinate values generated at step S209 with the high-compression PDF data generated at step S210 (step S208).

As described above, according to the second embodiment, in the case where it is determined that the processing time is shorter if the OCR process is executed by the image forming apparatus 10, it is possible to cause the image forming apparatus 10 to execute the OCR process. Therefore, likelihood that an average value of processing time of the image processing executed for scan images inputted to the image forming apparatus 10 is further shortened can be increased. Meanwhile, in the case where it is determined that at step S203 the processing time by the external device 20 is the same as the estimated processing time of the OCR process by the image recognition unit 128, the request to be performed by the external device 20 may be performed or may not be performed.

Meanwhile, the respective above-described embodiments may be implemented by using a device other than the image forming apparatus 10. For example, a digital camera, a camera-equipped mobile phone, a camera-equipped smart phone, a digital video camera, an electronic blackboard or the like may be used instead of the image forming apparatus 10. Even the above-described devices can input image data and transfer the image data via a network. Moreover, for a device other than the above-described devices, even if the device can input image data and can transfer the inputted image data via a network, the present embodiment of the present invention may be applied to the device.

Moreover, the processing request to be performed by the external device 20 is not limited to the image recognition process. Other process may be requested to be performed by the external device 20.

Meanwhile, an example of image processing task that can be requested to be performed by the external device 20, other than the OCR process, will be illustrated in the following.

Figure 18:
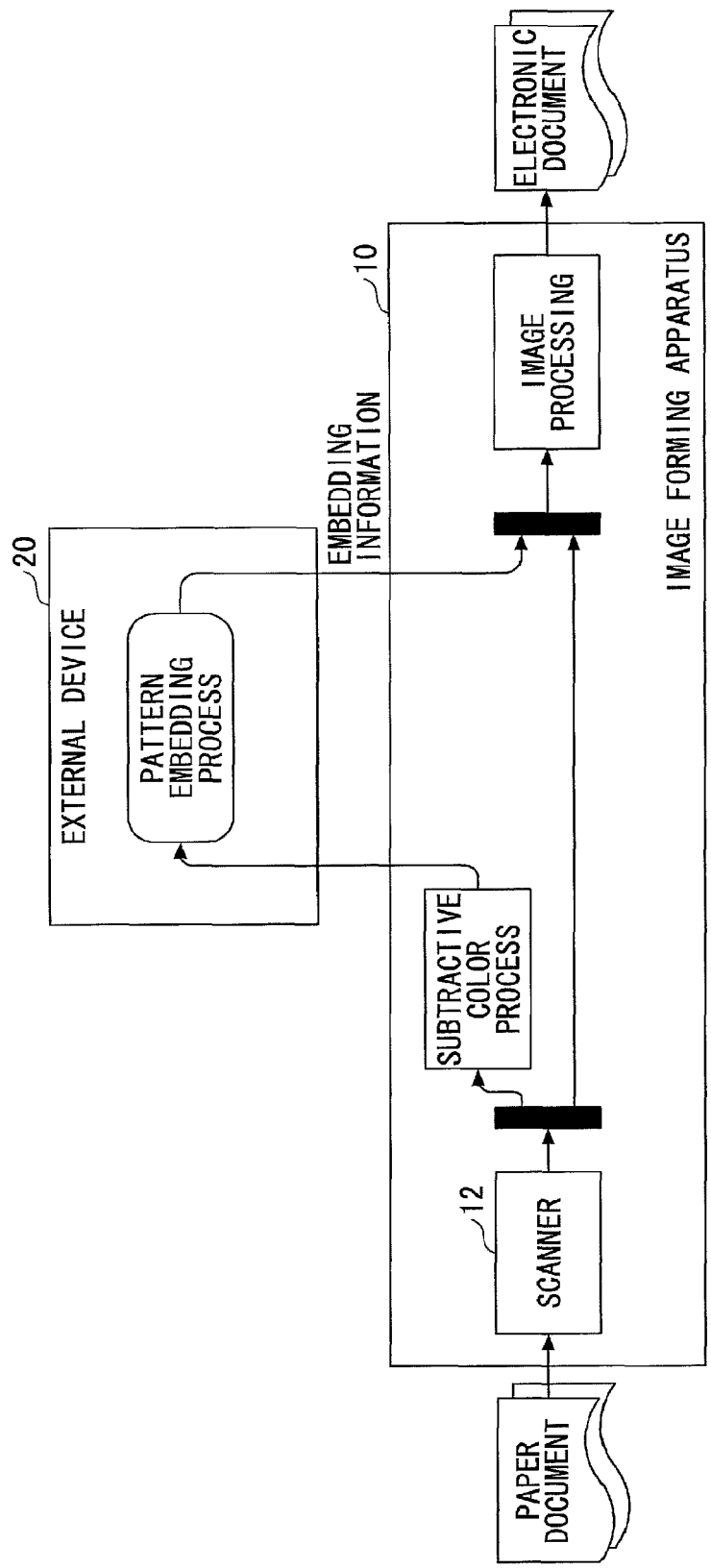
FIG. 18 is a diagram illustrating a first example of another image processing task that can be required to be performed by the external device.

FIG. 18 is a diagram illustrating a first example of another image processing task that can be requested to be performed by the external device 20. In FIG. 18, an example where a pattern embedding process is requested to be performed by the external device 20 is illustrated. The image forming apparatus 10 executes, for example, a subtractive color process for image data scanned from a paper document. The image forming apparatus 10 sends reduced data in which a data amount is reduced by the subtractive color process to the external device 20. In the subtractive color process, color depth of an image (bpp: bit per pixel) is reduced to two colors of black and white. As a result, image data of a black image part (for example, a layer on which black is drawn) are generated as reduced data. The external device 20 executes a process of generating image data indicating a background pattern regarding the reduced data (pattern embedding process), and transfers the generated image data to the image forming apparatus 10. Meanwhile, data obtained by combining an image indicating the background pattern with the reduced data may be transferred to the image forming apparatus 10. The image forming apparatus 10 combines the transferred image data with the scan image.

Figure 19:
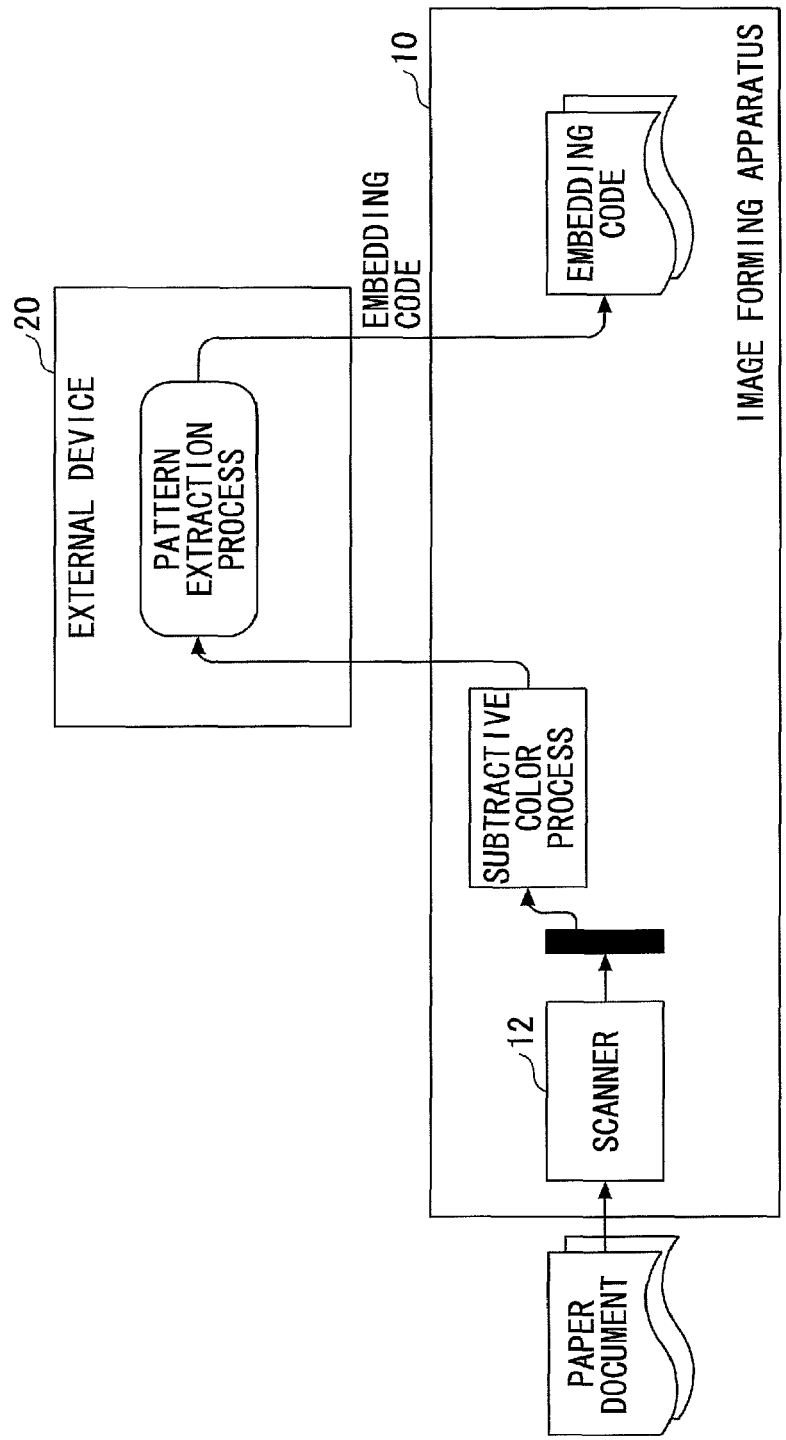
FIG. 19 is a diagram illustrating a second example of another image processing task that can be required to be performed by the external device.

FIG. 19 is a diagram illustrating a second example of another image processing task that can be requested to be performed by the external device 20. In FIG. 19, an example where an extraction process for extracting a background pattern from an image is requested to be performed by the external device 20 is illustrated. The image forming apparatus 10 executes, for example, the subtractive color process for image data scanned from a paper document. The image forming apparatus 10 sends reduced data in which a data amount is reduced by the subtractive color process to the external device 20. The external device 20 extracts a code embedded by the background pattern (embedding code) from an image indicated by the reduced data, and transfers a result of extraction to the image forming apparatus 10. The image forming apparatus 10 executes tampering detection, a protection against illegal copying or the like based on the embedding code.

Figure 20:
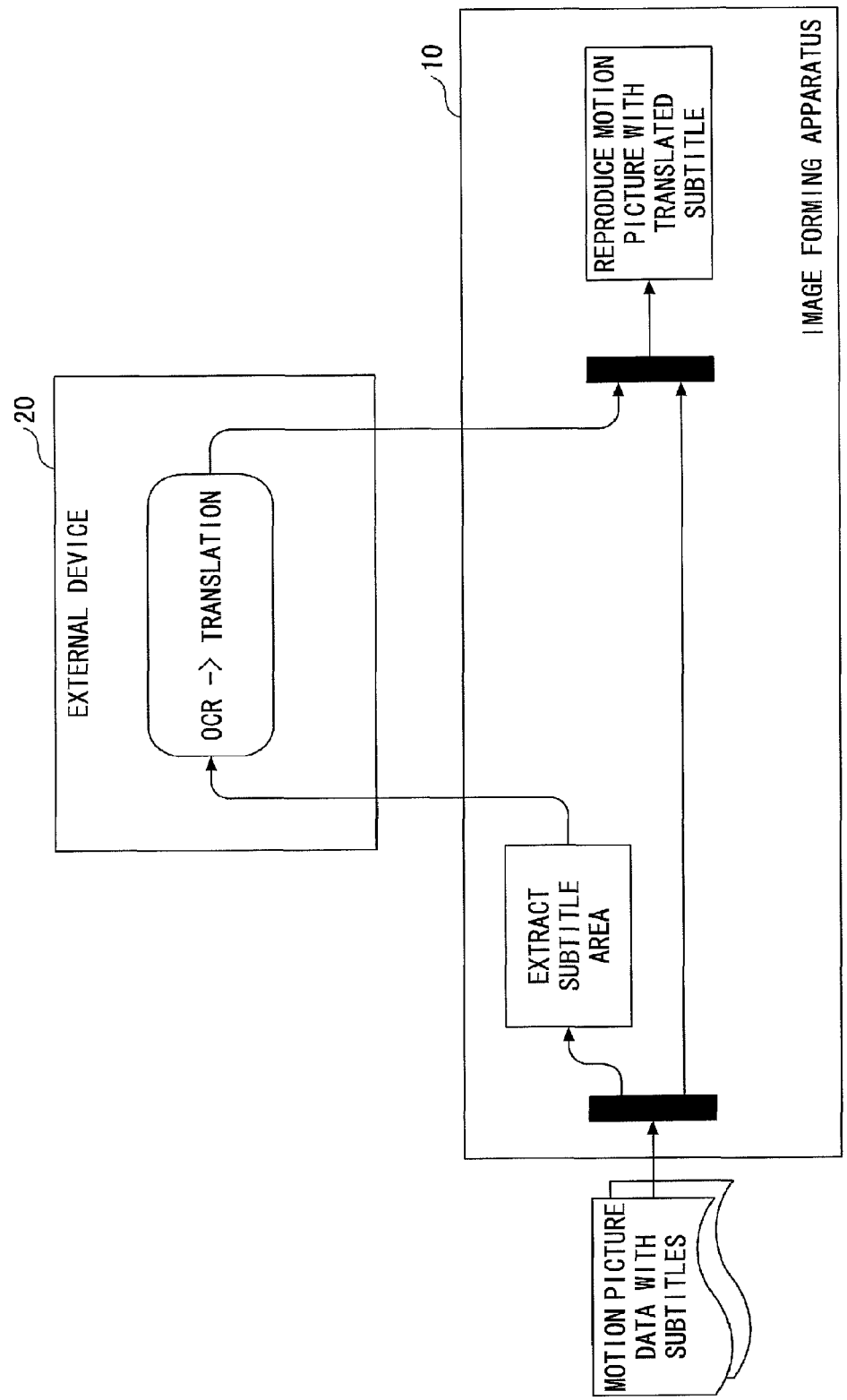
FIG. 20 is a diagram illustrating a third example of another image processing task that can be required to be performed by the external device.

FIG. 20 is a diagram illustrating a third example of another image processing task that can be requested to be performed by the external device 20. In FIG. 20, the image forming apparatus 10 extracts, for example, a subtitle area in an image while reproducing a motion picture with subtitles, and sends image data of the subtitle area to the external device 20 as reduced data. The external device 20 executes the OCR process and a translation process for the reduced data, and transfers text data of an execution result (text data in a language different from the original language) to the image forming apparatus 10. The image forming apparatus 10 combines the transferred text data with a motion picture during reproduction. As a result, a motion picture in which subtitles are translated is reproduced.

FIG. 21 is a diagram illustrating a fourth example of another image processing task that can be requested to be performed by the external device 20. In FIG. 21, the image forming apparatus 10 extracts voice data from motion picture data, and sends the voice data of an extraction result as reduced data to the external device 20. The external device 20 executes a voice translation process for the reduced data, and transfers voice data after translation to the image forming apparatus 10. The image forming apparatus 10 reproduces the transferred voice data along with the motion picture data. As a result, a motion picture in which voice is translated is reproduced.

Devices such as image forming apparatuses are strictly restricted in hardware resources, and processing speeds for image processing of high load may be less than those of general-purpose computers or the like.

Then, external devices such as computers having relatively high processing performances may be required to perform image processing of high load via a network.

However, in the case of requiring the image processing via the network, depending on communication rate of the network, transfer time of image data to be processed may be too great to neglect with respect to whole processing time. As a result, a situation that processing time in the case where all processes are performed in image forming apparatus is shorter after all can occur.

According to the embodiment of the present application, an influence of network communication on a processing request via the network can be reduced.

Meanwhile, in the respective embodiments, the image forming apparatus 10 is an example of a device. The external device 20 is an example of an information processing apparatus. The image input unit 121 is an example of an input unit. The data reduction unit 122 is an example of a reduction unit. The data transfer unit 123 is an example of a transmission unit. The response reception unit 124 is an example of a reception unit. The image conversion unit 125 is an example of a first data processing unit. The data composition unit 126 is an example of a composition unit. The image recognition unit 128 is an example of a second data processing unit.

Further, the present invention is not limited to these embodiments, but various variations and modifications may be made without departing from the scope of the present invention.

The present application is based on and claims the benefit of priority of Japanese Priority Application No. 2014-185145 filed on Sep. 11, 2014, the entire contents of which are hereby incorporated by reference.

What is claimed is:

1. A device, comprising:
processing circuitry configured to obtain first data and perform a part of a first process on first data to generate second data, a data amount of the second data being less than a data amount of the first data, the first process being requested to be performed by an information processing apparatus connected via a network, and the second data being processed so that a remainder of the first process is executable in the information processing apparatus;
a transmitter configured to transmit the generated second data to the information processing apparatus; and
a receiver configured to receive third data via the network, the information processing apparatus performing the remainder of the first process on the second data to generate the third data, wherein both the second data transmitted by the transmitter and the third data received by the receiver are derived from the first data obtained by the processing circuitry.

2. The device as claimed in claim 1, wherein the processing circuitry is further configured to perform a binarization process on the first data to generate the second data, the part of the first process including the binarization process.

3. The device as claimed in claim 2, wherein the first process includes a process of extracting text data from the first data.

4. The device as claimed in claim 1, wherein the processing circuitry is further configured to:
perform a second process on the first data to generate fourth data, the second process being different from the first process, and
combine the generated fourth data with the received third data.

5. The device as claimed in claim 4, wherein the processing circuitry is further configured to combine text data with the fourth data, the text data being generated by performing the first process.

6. The device as claimed in claim 5, wherein the processing circuitry is further configured to generate PDF (portable document format) data based on the first data, and combine the generated PDF data with the text data to generate PDF data with transparent text.

7. The device as claimed in claim 1, wherein the processing circuitry is further configured to:
perform the first process on the second data; and
determine whether to transmit the generated second data to the information processing apparatus based on a communication rate of the network, the data amount of the second data, an estimated processing time required for performing the first process for the second data by the information processing apparatus, and an estimated processing time required for performing the first process on the second data by the processing circuitry,
wherein when the processing circuitry determines to transmit the second data, the transmitter transmits the second data to the information processing apparatus, and
when the processing circuitry determines not to transmit the second data, the processing circuitry performs the first process on the second data.

8. A data processing method for processing data in a device, the method comprising:
inputting first data;
performing a part of a first process on the first data to generate second data, a data amount of the second data being less than a data amount of the first data, the first process being requested to be performed by an information processing apparatus connected via a network, and the second data being processed so that a remainder of the first process is executable in the information processing apparatus;
transmitting the generated second data to the information processing apparatus; and
receiving third data via the network, the information processing apparatus performing the remainder of the first process on the second data to generate the third data, wherein both the transmitted second data and the received third data are derived from the inputted first data.

9. The data processing method as claimed in claim 8, wherein the part of the first process includes a binarization process, which is performed on the first data to generate the second data.

10. The data processing method as claimed in claim 9, wherein the first process includes a process of extracting text data from the first data.

11. The data processing method as claimed in claim 8, further comprising:

performing a second process on the first data to generate fourth data, the second process being different from the first process; and combining the generated fourth data with the received third data.

12. The data processing method as claimed in claim 11, further comprising combining the fourth data with text data generated by performing the first process.

13. A non-transitory computer program product to be executed on a computer to perform a method, the method comprising:

inputting first data;

performing a part of a first process on the first data to generate second data, a data amount of the second data being less than a data amount of the first data, the first process being requested to be performed by an information processing apparatus connected via a network, and the second data being processed so that a remainder of the first process is executable in the information processing apparatus;

transmitting the generated second data to the information processing apparatus; and receiving third data via the network, the information processing apparatus performing the remainder of the first process on the second data to generate the third data, wherein both the transmitted second data and the received third data are derived from the inputted first data.

14. The computer program product as claimed in claim 13, wherein the part of the first process includes a binarization process, which is performed on the first data to generate the second data.

15. The computer program product as claimed in claim 14, wherein the first process includes a process of extracting text data from the first data.

16. The computer program product as claimed in claim 13, further comprising:

performing a second process on the first data to generate fourth data, the second process being different from the first process; and combining the generated fourth data with the received third data.

17. The computer program product as claimed in claim 16, further comprising combining the fourth data with text data generated by performing the first process.

* * * * *